United States Patent [19]

Drubetsky et al.

[11] Patent Number: 5,351,551
[45] Date of Patent: Oct. 4, 1994

[54] CONVECTION THERMOCOUPLE VACUUM GAUGE

[75] Inventors: Emil Drubetsky, Philadelphia; Donald R. Taylor, Jr., Chalfont; Leonard Woshczyn, Bensalem, all of Pa.

[73] Assignee: The Fredericks Company, Huntingdon Valley, Pa.

[21] Appl. No.: 68,328

[22] Filed: May 27, 1993

[51] Int. Cl.$^5$ .............................................. G01L 21/14
[52] U.S. Cl. ......................................... 73/755; 374/45
[58] Field of Search ............................ 73/755; 374/45

[56] References Cited

U.S. PATENT DOCUMENTS

| | | | |
|---|---|---|---|
| 2,460,873 | 2/1949 | Clewell et al. | 73/755 |
| 2,745,283 | 5/1956 | Hastings | 73/204 |
| 3,030,806 | 4/1962 | Davis | 73/204 |
| 3,903,743 | 9/1975 | Noller | 73/361 |
| 4,492,123 | 1/1985 | Reich | 73/755 |
| 4,579,002 | 4/1986 | Zettler | 73/755 |
| 4,633,717 | 1/1987 | Scholl | 73/755 |

OTHER PUBLICATIONS

Steckelmacher, W., "The high pressure sensitivity extension of thermal conductivity gauges," *Vacuum*, vol. 23, No. 9, 1973, pp. 307-311.

*Primary Examiner*—Richard E. Chilcot, Jr.
*Assistant Examiner*—Joseph L. Felber
*Attorney, Agent, or Firm*—Seidel, Gonda, Lavorgna & Monaco

[57] ABSTRACT

A thermocouple vacuum gauge includes a first thermocouple element spaced below a second thermocouple element. The two thermocouple elements are electrically connected in series in a back-to-back manner by connecting together their respective negative ends. A pulse generator supplies a pulsing on-off current only to the first thermocouple element. During the off intervals, a switch connects the positive ends of both thermocouple elements to a voltage measuring and comparing circuit which measures a thermally generated voltage signal between the positive ends of the thermocouple elements and compares the measured voltage signal to a reference signal. The result of the comparison is used to vary the output current of the pulse generator so as to supply an amount of current to the first thermocouple element sufficient to cause the measured voltage signal to approach the reference signal. The amount of current supplied sufficient to cause the measured voltage signal to approach the reference signal is proportional to the amount of pressure or vacuum in an enclosure in which the thermocouples of the vacuum gauge are placed. A method for measuring pressure at partial vacuum which employs these features is also described.

14 Claims, 2 Drawing Sheets

CONVECTION THERMOCOUPLE VACUUM GAUGE

FILED OF THE INVENTION

This invention relates to a thermocouple apparatus to measure pressures under partial vacuum and more particularly to an apparatus sensitive to pressures over a wider range. The invention is described in the context of, but is not limited to, a thermocouple vacuum gauge.

BACKGROUND OF THE INVENTION

Thermocouple vacuum gauges are known in the art. Typically, such gauges employ one or more thermocouples in a circuit configuration.

A thermocouple is, itself, an electric circuit consisting of a pair of wires of dissimilar metals joined together at one end (the sensing or measuring junction, also called the hot junction) and terminated at their other end in such a manner that the terminals (reference junction or cold junction) are both at the same and known temperature (reference temperature). Leads are connected from the reference junction to some sort of load resistance (e.g., an indicating meter or the input impedance of other readout or signalconditioning equipment) to complete the thermocouple circuit. Both these connecting leads can be of copper or some other metals dissimilar from the metals joined at the sensing junction.

Due to the thermoelectric effect (Seebeck effect), a current is caused to flow through the circuit whenever the sensing junction and the reference junction are at different temperatures. The electromotive force (thermoelectric EMF) which causes current to flow through the circuit is dependent in its magnitude on the sensing junction wire materials, as well as on the temperature difference between the two junctions.

Thermocouple vacuum gauges are widely used as vacuum measuring devices in the pressure range of $10^{-3}$ to 1 torr. The term "vacuum" which strictly speaking implies the unrealizable ideal of space entirely devoid of matter, is used in a relative sense to denote gas pressure below the normal atmospheric pressure of 760 torr. The degree or quality of the vacuum attained is indicated by the total pressure of the residual gases in the vessel which is pumped. By standard conventional terminology, a coarse or rough vacuum has a pressure range from 760 to 1 torr, a medium vacuum has a pressure range from 1 to $10^{-3}$ torr, a high vacuum has a pressure range from $10^{-3}$ to $10^{-7}$ torr, a very high vacuum has a pressure range from $10^{-7}$ to $10^{-9}$ torr, and an ultrahigh vacuum has pressures smaller than $10^{-9}$ torr.

In a typical thermocouple vacuum gauge, a thermocouple is heated either directly (e.g., by sending current through it) or indirectly (e.g., by a separate heater). The EMF generated by the temperature gradient between the reference or cold junction and the sensing or hot junction is recorded as a measure of the sensing or hot junction temperature. The sensing or hot junction temperature will change with the pressure of the surrounding gas because of heat transfer from the hot wire. The variation with pressure of the heat transfer from a hot wire through the surrounding gas is shown schematically in prior art FIG. 1. In the low pressure region, the heat transfer by conduction through the surrounding gas is proportional to the log of gas density or pressure. In the higher pressure regions (above approximately 2 torr) and in the absence of natural or forced convective cooling, the thermal conductivity is virtually independent of pressure. This independent relationship renders thermocouple devices useless for measuring pressure in these regions. If heat transfer by convection is encouraged in these higher pressure regions, it is possible to obtain additional pressure dependent heat transfer. The broken line in FIG. 1 represents such an extension of this proportional relationship, thereby allowing one to extend upward the range of pressures that can be measured by thermal conductivity gauges.

Various attempts in the prior art to extend the range of thermal conductivity gauges by forced (active) and natural convection are described in Steckelmacher, W. "The high pressure sensitivity extension of thermal conductivity gauges," *Vacuum*, vol. 23, no. 9, Pergamon Press Ltd., 1973, 307–311.

U.S. Pat. No. 4,579,002 discloses a thermocouple vacuum gauge for measuring pressure in an evacuated enclosure. FIG. 1 of that patent shows a block diagram of the gauge. A time-multiplexed servomechanism 10 is used to supply a duration modulated constant amplitude heating pulse to thermocouple 12. In the intervals between heating, the EMF of the thermocouple is measured and compared to a reference voltage. The current needed to maintain the thermocouple at a constant temperature determines the duty cycle of the pulses. This duty cycle is a function of the pressure in the apparatus. Only one thermocouple is employed in this system. A linear response of temperature vs. pressure over approximately six orders of magnitude of pressure is possible with this configuration. A similar type of device is described in U.S. Pat. No. 4,633,717.

Thermocouples are also used for measuring temperature, pressure and fluid flow. Employing a plurality of thermocouples in a single measuring circuit is known in the art.

U.S. Pat. No. 3,030,806 discloses a flowmeter which utilizes temperature-difference effects manifested in Seebeck-Peltier junctions in response to a change in physical conditions (i.e., fluid flow). In the embodiment depicted by FIG. 3 of this patent, thermocouples S1 and S2 are connected in series with each other and disposed within the path of fluid flow. Thermocouple S1 has a Seebeck junction and thermocouple S2 has a Peltier junction. An A.C. energization source 150 is connected to thermocouple S1. During one-half of the A.C. energization source cycle, the Peltier junction will be heated above ambient temperature and the flow of fluid passing the Peltier junction will result in a cooling effect. Similarly, on the following half of the A.C. energization source cycle, the Peltier junction will be cooler than ambient temperature and will, therefore, absorb heat from the fluid medium being measured. The temperature changes will produce a varying current flow in the Seebeck thermocouple. The amplitude of the current flow will be decreased due either to such heating or cooling by the fluid flow medium. The resultant output signal of the series connected thermocouples is, therefore, an alternating current signal or modulated carrier signal. The degree of modulation represents, or is proportional to, the rate of fluid flow passing the junctions. In the FIG. 3 embodiment of this patent, thermocouples S1 and S2 are continuously connected in series.

U.S. Pat. No. 3,903,743 discloses a typical temperature compensating circuit where one of two series connected and oppositely poled thermocouples is employed for correction. None of the thermocouples are alternately heated.

U.S. Pat. No. 2,745,283 discloses another temperature compensation circuit for a thermal measuring device which employs thermocouples. In the FIG. 4 embodiment of U.S. Pat. No. 2,745,283, the compensating thermocouple is not connected in series with the heated thermopile (battery of thermocouples).

U.S. Pat. No. 4,492,123 discloses probe-type thermal conductivity vacuum gauges (Pirani gauges) which are insensitive to the physical and electrical nature of the probe circuitry. The invention allows for the transmission of low measuring voltages from the thermocouples to be unaffected by long lead lengths or circuit elements, thereby improving the accuracy of the gauges.

Many prior art designs use a very high temperature filament to extend the range of thermal conductivity gauges. However, high temperatures are undesirable for most applications. Furthermore, prior art thermocouple gauges, even those which employ a constant sensing element temperature rather than a constant heating current, are limited in sensitivity (accuracy) at high pressure.

In spite of the extensive efforts in the prior art to extend the operating range of thermocouple vacuum gauges, there is still a need for a thermocouple vacuum gauge which has an extended range without the need to employ high operating temperatures, varying temperatures or forced (active) convective apparatus. There is also still a need for a vacuum gauge which has improved accuracy in the high pressure range. There is further a need for achieving these goals through a design that is inexpensive and simple to fabricate. The present invention fills those needs.

SUMMARY OF THE INVENTION

The present invention defines a thermocouple vacuum gauge comprising a heated and a non-heated thermocouple element, a pulse generator for generating on-off electrical heating pulses to the heated thermocouple element, a voltage measuring and comparing circuit, switch means, and means for varying the output current of the pulse generator. The heated thermocouple is physically spaced below the non-heated element and is electrically connected in series in a back-to-back manner to the non-heated thermocouple by having one of their respective like ends connected together at least during the off periods. The voltage measuring and comparing circuit measures a thermally generated voltage signal between the other respective like ends of the thermocouple elements during the off periods and compares the measured voltage signal to a reference signal. The switch means connects the other respective like ends of the thermocouple elements to the voltage measuring and comparing circuit only during the off periods of the heating pulses so as to allow the voltage measuring and comparing circuit to make its measurement and comparison only during the off periods. The means for varying the output current of the pulse generator supplies an amount of current to the heated thermocouple element sufficient to cause the measured voltage signal to approach the reference signal. The hot junctions of the thermocouple elements overlie each other and are spaced apart by a preselected distance.

In another embodiment, the invention defines a system for measuring pressure at partial vacuum comprising a first and a second thermocouple element in the partial vacuum, a pulse generator for supplying a pulsing on-off current to the first thermocouple element, a voltage measuring and comparing circuit, switch means, and means for varying the output of the pulse generator. The thermocouple elements each have hot and cold junctions. The hot junction of the first thermocouple element is spaced below the hot junction of the second thermocouple element. The thermocouple elements each have positive and negative ends corresponding to the cold junctions. The pulse generator supplies a pulsing on-off current to the first thermocouple element. The negative ends of the thermocouple elements are connected together at least during the off intervals of the on-off current. The voltage measuring and comparing circuit measures a thermally generated voltage signal between the positive ends of the thermocouple elements during the off intervals and compares the measured voltage signal to a reference signal. The switch connects the positive ends of the thermocouple elements to the voltage measuring and comparing circuit during the off intervals so as to allow the voltage measuring and comparing circuit to make its measurement and comparison. The switch disconnects the positive ends of the thermocouple elements from the voltage measuring and comparing circuit during the on intervals of the on-off current. The means for varying the output current of the pulse generator supplies an amount of current to the first thermocouple element sufficient to cause the measured voltage signal to approach the reference signal. The amount of current supplied is proportional to the pressure.

In yet another embodiment, the invention defines a method for measuring pressure at partial vacuum comprising the steps of alternately providing an electrically generated heating current to a first thermocouple element, connecting the first thermocouple element to a second thermocouple element in series in a back-to-back manner at least when the heating current is off by connecting together one of their like ends, measuring thermally generated EMF between the other respective ends of the thermocouple elements when the heating current is off, comparing the thermally generated EMF to a reference signal, and varying the heating current so as to cause the thermally generated EMF to approach the reference signal. The amount of current supplied sufficient to cause the measured voltage signal to approach the reference signal is proportional to the amount of pressure. The first thermocouple element is spaced below the second thermocouple element.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENT

Figure 1:
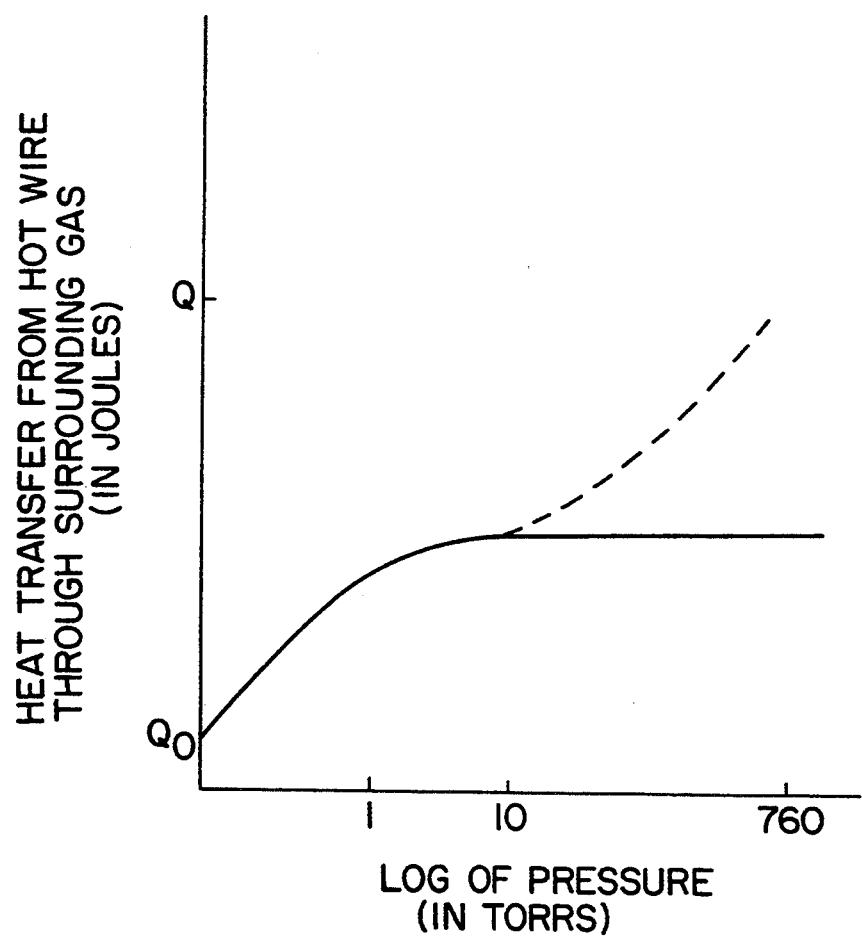
FIG. 1 is a prior art schematic diagram of thermocouple heat transfer characteristics through a gas as a function of the pressure of the gas.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Apparatus depicting a preferred embodiment of the thermocouple vacuum gauge is illustrated in the drawings.

Figure 2:
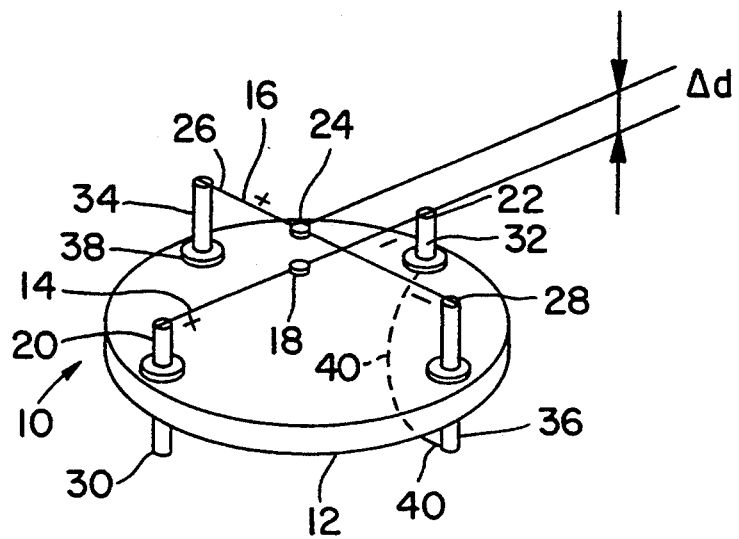
FIG. 2 is a perspective view of the sensing header of a convection thermocouple vacuum gauge in accordance with one embodiment of the invention.

FIG. 2 shows a sensing header 10 of a thermocouple vacuum gauge in accordance with the invention. The header 10 includes a disc or plate 12 which functions as a mounting platform for thermocouples 14 and 16. (As will be described below with respect to FIG. 3, thermocouple 14 is distinguished from thermocouple 16 in that thermocouple 14 is alternately heated electrically by a time multiplexed power supply whereas thermocouple 16 is not heated electrically.)

Thermocouples 14 and 16 are conventional thermocouples, as described above in the Background of the Invention. Thermocouple 14 consists of two wires of dissimilar metals joined together at hot junction 18 and terminated at their other ends by cold junctions 20 and 22, represented by (+) and (−) terminals, respectively. Likewise, thermocouple 16 has a hot junction 24 and cold junctions 26 and 28.

Pin supports 30, 32, 34 and 36 are mounted on plate 12 through insulators 38. The pin supports 30-36 project axially through both faces of the plate 12. The axially projecting segments or legs of the pin supports connect the thermocouples to the other elements of the vacuum gauge.

The cold junctions 20, 22, 26 and 28 of the thermocouples 14 and 16 are fixed to respective pin supports 30-36, such as by welding. The negative terminals of the thermocouples are connected together by wire 40 (shown in phantom by a dotted line) running between the legs of pin supports 32 and 36 underneath the plate 12. In the exemplary embodiment, the pin supports 30-36 are placed near the periphery of the plate 12 and are equally spaced around the periphery. The pin supports for each thermocouple are oppositely disposed with respect to each other. Thus, when the thermocouples are connected to their respective pin supports, the thermocouples are skew to one another. In the depicted embodiment, the thermocouples are perpendicularly disposed and spaced apart with respect to each other.

An important feature of the invention is that pin supports 34 and 36 which carry thermocouple 16 project outward from plate 12 further than pin supports 30 and 32 which carry thermocouple 14. Since the thermocouples 14 and 16 are relatively rigid, the difference in outward projection causes the hot junction 24 of thermocouple 16 to be spaced above the hot junction 18 of thermocouple 14 by the difference in the pin support projection. This difference in height is shown in FIG. 2 as Δd. In the exemplary embodiment, hot junction 24 is directly above hot junction 18. The placement of thermocouple 16 (which is not heated electrically by an active heating source) above thermocouple 14 (which is alternately heated electrically) provides important benefits in extending the range of the vacuum gauge, as will be described below.

Figure 3:
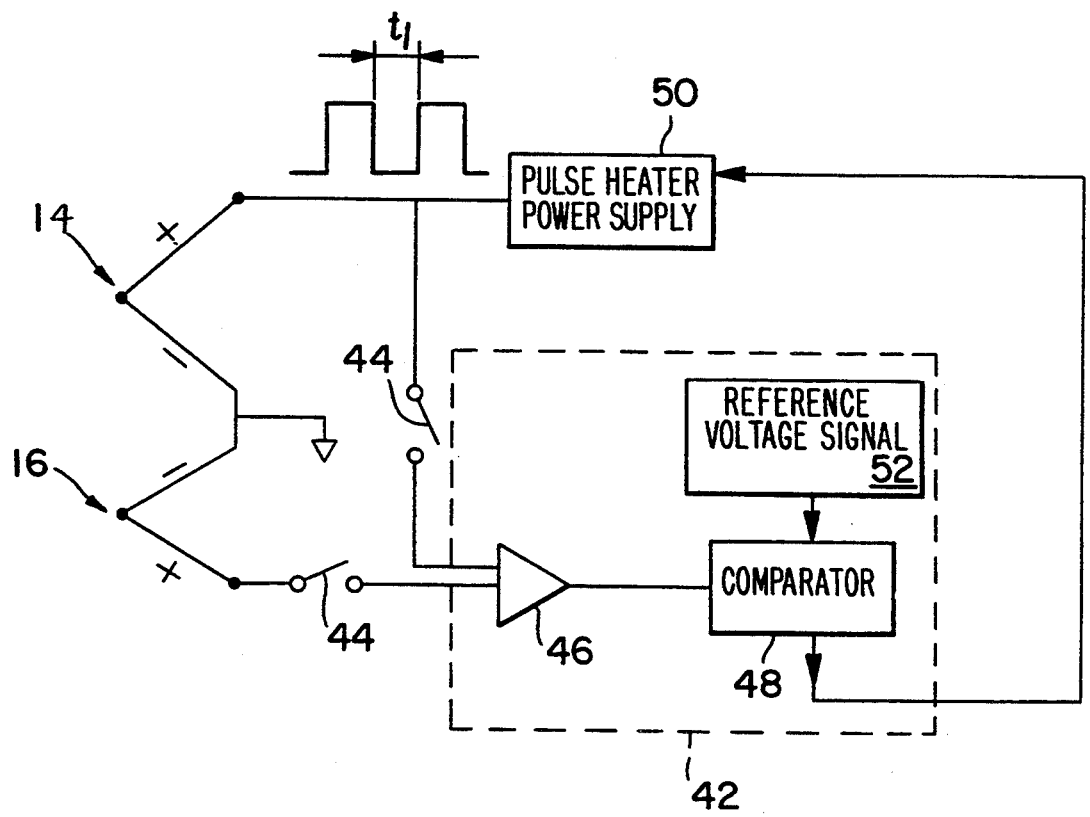
FIG. 3 is an electrical block-diagram of the convection thermocouple vacuum gauge employing the sensing header of FIG. 2.

FIG. 3 is an electrical block diagram of the convection thermocouple vacuum gauge and shows how thermocouples 14 and 16 in the sensing header 10 of FIG. 2 are connected in the circuitry of the vacuum gauge. In the exemplary embodiment of the circuitry, a voltage measuring and comparing circuit 42 is selectively connected and disconnected from the thermocouples 14 and 16 by switch 44. The voltage measuring and comparing circuit 42 includes differential amplifier 46 for receiving at its inputs the positive ends of the thermocouples when the switch 44 is closed, and directing its output to comparator 48 (described below). The switch 44 is shown in FIG. 3 as two single throw switches, but may be a double pole, double throw (DPDT) switch. In addition, other switching configurations, such as a flying capacitor switch, can be employed to achieve a similar result. A pulse heater power supply 50 supplies a pulsed ON-OFF current through the two joined wires of thermocouple 14. During the ON cycle of the pulsed current, the switch 44 opens (disconnects) the positive side of thermocouple 16 from the voltage measuring and comparing circuit 42. Thus, during the ON cycle, the thermocouple 16 is not heated by the pulse heater power supply 50 and only thermocouple 14 is heated by the power supply 50. During the OFF cycle of the pulsed current (i.e., in the time interval between heating pulses) as represented by interval $t_1$, the switch 44 connects the positive ends of thermocouples 14 and 16 to the differential inputs of amplifier 46 in the voltage measuring and comparing circuit 42. Although FIG. 3 shows a rectangular or square-wave pulsed ON-OFF current, it should be recognized that any pulsed waveform can be employed without departing from the scope of the invention.

Another important feature of the invention is that the thermocouples 14 and 16 are connected together in series in a back-to-back manner (i.e., each of their negative terminals are connected together). Wire 40, described above with respect to FIG. 2, provides a permanent negative terminal connection. Thus, the switch 44 needs only close a connection between the positive terminals of the thermocouples.

During the OFF cycle of the pulsed current and while the thermocouples 14 and 16 are connected together in series, the thermally generated EMF of both thermocouples (i.e., the EMF between the positive end of thermocouple 16 and the positive end of thermocouple 14) is measured and compared to a reference voltage signal 52 in comparator 48. That is, the switch 44 connects the positive ends of both thermocouples to the voltage measuring and comparing circuit 42 such that the EMF between the positive end of thermocouple 16 and the positive end of thermocouple 14 is measured in differential amplifier 46 and compared to the reference voltage signal 52.

Since thermally generated EMF is proportional to the temperature of the hot junction of a thermocouple, the output of the comparator 48 can be used to control the current supplied to a thermocouple so as to maintain it at a preselected temperature. The amount of current which is then provided to the thermocouple will be proportional to the measured pressure. Thus, the output of comparator 48 communicates with the pulse heater power supply 50 to tell it whether to increase, decrease, or maintain its present current output. The amount of output current is then used to determine pressure. This scheme relies on the well-known principle that the higher the pressure, the more gas molecules occupy a given space, and thereby the more heat loss from the thermocouple by convection will occur. The greater the heat loss from the thermocouple, the more current will be needed to maintain a constant temperature at the hot junction of the thermocouple.

The novel arrangement of thermocouples 14 and 16, in combination with the application of heating pulses to thermocouple 14, allows the thermocouple vacuum gauge to overcome inherent difficulties in measuring pressure in coarse or rough vacuum environments.

In the medium vacuum range (low pressure range from 1 to $10^{-3}$ torr), convection is practically non-existent. Thus, no appreciable amount of heat will be transferred by convection from the lower thermocouple 14 (which is alternately heated by heater power supply 50) to the upper thermocouple 16. Since the upper thermocouple 16 is not alternately heated by the heater power supply 50, the hot junction 24 of thermocouple 16 will be maintained at the same temperature as its cold junctions 26 and 28. Thus, in medium vacuum ranges, the only effect that the back-to-back connection of non-heated thermocouple 16 and heated thermocouple 14 has on thermocouple 14 is that the thermocouple 16 provides thermocompensation for ambient temperature changes. In this manner, the thermocouple vacuum gauge behaves like a conventional prior art thermocouple gauge wherein a second thermocouple provides temperature compensation (e.g., FIG. 4 of U.S. Pat. No. 2,745,283).

In contrast, in a coarse or rough vacuum range (higher pressure range of 10-760 torr) where convection occurs, the non-heated hot junction 24 of upper thermocouple 16 receives convectively transferred heat from the hot junction 18 of alternately heated lower thermocouple 14. This indirect heating of hot junction 18 causes a temperature difference between the hot junction 18 and cold junctions 26 and 28 of the thermocouple 16, which, in turn, causes the generation of thermoelectric EMF. Thus, the thermocouple 16 will provide a measurable contribution to the total thermoelectric EMF signal output of the pair of thermocouples, whereas the thermocouple 16 provides no such contribution in the low pressure environment.

Since both of the thermocouples 14 and 16 are connected back-to-back, the additional signal contribution from thermocouple 16 in the higher pressure range can be subtracted from the output signal of the heated thermocouple 14 and recognized as the temperature drop responsible for any increases in current required by the pulse heater power supply 50 to maintain thermocouple 14 at a preselected temperature.

Additionally, the alternate, pulsed heating current increases thermocouple contact with the surrounding gas by producing small amounts of mechanical motion of the thermocouple wire caused by the expansion and contraction of the wire.

The measurable contribution of thermoelectric EMF from the thermocouple 16 and the increased thermocouple contact due to expansion and contraction enhances the output of the gauge, thereby improving gauge sensitivity in the higher pressure range of 10-760 torr.

As noted above, many prior art designs resort to an undesirable method of raising the maintenance temperature of a hot junction of a thermocouple in order to extend the operating range into high pressure regions. One important aspect of this invention is that no such elevated temperatures are needed. In experimental trials, a maintenance temperature in the range from about 80 to 150 degrees Celsius performed satisfactorily so as to allow the operating range to be extended into the range of 10-760 torr. In these experimental trials, $\Delta d$ in FIG. 2 varied from $\frac{1}{8}$ of an inch to $\frac{1}{4}$ of an inch, depending on the volume of the gauge enclosure and the thickness of the thermocouple wires.

In order to achieve maximum gauge sensitivity, the hot junction 24 of the non-heated thermocouple 16 should ideally be located directly above the hot junction 18 of heated thermocouple 14. However, other placements can work so long as the non-heated thermocouple 16 can receive an amount of convectively transmitted heat from the heated thermocouple 14 that can provide a detectible amount of thermally generated EMF voltage.

It should be recognized that wire 40 which provides a permanent negative terminal connection between the thermocouples can be replaced by a switch that works in tandem with switch 44 so as to provide a simultaneous connection of the negative terminals of the thermocouples to each other and a connection of the positive terminals of the thermocouples to the voltage measuring and comparing circuit.

The convection thermocouple vacuum gauge described above provides significant advantages not contemplated by prior art thermocouple vacuum gauges. The simple addition of a second back-to-back connected thermocouple switched in series with a first thermocouple during OFF periods of a pulsed current supply allows for the operating range of thermocouple vacuum gauges to be extended to higher pressure regions, thereby enhancing the number of applications where such gauges may be suitable. A lower and constant temperature can be employed, thereby improving stability, increasing safety of operation, and lessening susceptibility of the gauge to contamination.

The present invention may be embodied in other specific forms without departing from the spirit or essential attributes thereof and, accordingly, reference should be made to the appended claims, rather than to the foregoing specification, as indicating the scope of the invention.

I claim:

1. A thermocouple vacuum gauge comprising:
   (a) a heated and a non-heated thermocouple element, the heated thermocouple element being spaced below the non-heated element;
   (b) a pulse generator for generating on-off electrical heating pulses to the heated thermocouple element, the heated and non-heated thermocouple elements being electrically connected in series in a back-to-back manner by having one of their respective like ends connected together at least during off periods, the off periods being the time between the end of a heating pulse and the beginning of a subsequent heating pulse;
   (c) a voltage measuring and comparing circuit for measuring a thermally generated voltage difference between the other respective like ends of the thermocouple elements during the off periods, generating a voltage signal related to the difference and comparing the voltage signal to a reference signal;
   (d) switch means for connecting said other respective like ends of the thermocouple elements to the voltage measuring and comparing circuit only during the off periods of the heating pulses so as to allow the voltage measuring and comparing circuit to make its measurement and comparison only during said off periods; and (e) means for varying the output current of the pulse generator so as to supply an amount of current to the heated thermocouple element sufficient to cause the voltage signal to approach the reference signal, the amount of supplied current being proportional to the vacuum level.

2. The thermocouple vacuum gauge of claim 1, wherein the thermocouple elements are mounted on a support, the non-heated thermocouple element overlying the heated thermocouple element and spaced therefrom by a preselected distance.

3. The thermocouple vacuum gauge of claim 2, wherein each thermocouple has a hot junction, the hot junctions overlying each other and being spaced apart by the preselected distance.

4. The thermocouple vacuum gauge of claim 3, wherein the thermocouple elements are skew to one another.

5. The thermocouple vacuum gauge of claim 1, wherein the pulse generator provides a pulsatile current output of on-off intervals.

6. The thermocouple of claim 1, wherein the thermocouple elements are substantially identical.

7. A system for measuring pressure at partial vacuum comprising:

(a) a first and a second thermocouple element in the partial vacuum, the thermocouple elements each having hot and cold junctions, the hot junction of the first thermocouple element being spaced below the hot junction of the second thermocouple element, the thermocouple elements each having positive and negative ends corresponding to the cold junctions;

(b) a pulse generator for supplying a pulsing on-off current to the first thermocouple element, the negative ends of the thermocouple elements being connected together at least during off intervals of said on-off current, the off intervals being the time between the end of a pulse of current and the beginning of a subsequent pulse of current;

(c) a voltage measuring and comparing circuit for measuring a thermally generated voltage difference between the positive ends of the thermocouple elements during the off intervals, generating a voltage signal related to the difference and comparing the voltage signal to a reference signal;

(d) switch means for connecting the positive ends of the thermocouple elements to the voltage measuring and comparing circuit during said off intervals so as to allow the voltage measuring and comparing circuit to make its measurement and comparison, the switch means disconnecting the positive ends of the thermocouple elements from the voltage measuring and comparing circuit during on intervals of said on-off current, the on intervals being the time between the beginning and end of a pulse of current; and (e) means for varying the output current of the pulse generator so as to supply an amount of current to the first thermocouple element sufficient to cause the voltage signal to approach the reference signal, the amount of current supplied being proportional to the pressure.

8. The system of claim 7, wherein the thermocouple elements are mounted on a support, the second thermocouple element overlying the first thermocouple element and spaced therefrom by a preselected distance.

9. The system of claim 8, wherein the hot junctions overlie each other and are spaced apart by the preselected distance.

10. The system of claim 9, wherein the thermocouple elements are skew to one another.

11. The system of claim 7, wherein the pulse generator provides a pulsatile current output of on-off intervals.

12. The system of claim 7, wherein the thermocouple elements are substantially identical.

13. A method for measuring pressure at partial vacuum comprising the steps of:

(a) providing an electrically generated heating current to a first thermocouple element which alternates between an on state and an off state;

(b) connecting the first thermocouple element to a second thermocouple element in series in a back-to-back manner at least when the heating current is off by connecting together one of their respective like ends, the first thermocouple element being spaced below the second thermocouple element;

(c) measuring thermally generated EMF between the other respective like ends of the thermocouple elements when the heating current is off;

(d) comparing the thermally generated EMF to a reference signal; and (e) varying the heating current so as to cause the thermally generated EMF to approach the reference signal, the heating current being proportional to the pressure.

14. The method of claim 13, wherein each thermocouple has a hot junction, the hot junctions overlying each other and being spaced apart by a preselected distance.

* * * * *